US009545688B2

(12) United States Patent
Jin (10) Patent No.: US 9,545,688 B2
(45) Date of Patent: Jan. 17, 2017

(54) DEVICE AND METHOD OF VIBRO-SPOT WELDING (71) Applicants: SUNGWOO HITECH CO., LTD., Busan (KR); PUKYONG NATIONAL UNIVERSITY BUSINESS INCUBATOR CENTER, Busan (KR)

(72) Inventor: In Tai Jin, Busan (KR)

(73) Assignees: SUNGWOO HITECH CO., LTD., Busan (KR); PUKYONG NATIONAL UNIVERISTY BUSINESS INCUBATOR CENTER, Busan (KR)

( * ) Notice: Subject to any disclaimer, the term of this patent is extended or adjusted under 35 U.S.C. 154(b) by 349 days.

(21) Appl. No.: 14/250,466

(22) Filed: Apr. 11, 2014

(65) Prior Publication Data
US 2015/0202711 A1 Jul. 23, 2015

(30) Foreign Application Priority Data
Jan. 21, 2014 (KR) .................. 10-2014-0007476

(51) Int. Cl.
B23K 11/10 (2006.01)
B23K 11/12 (2006.01)
(52) U.S. Cl.
CPC ...................... *B23K 11/12* (2013.01)
(58) Field of Classification Search
CPC ...................................... B23K 11/12
USPC .......... 219/65, 84, 86.1, 86.25, 88, 89, 91.2; 92/13.6, 85 R, 84, 87
See application file for complete search history.

(56) References Cited

U.S. PATENT DOCUMENTS

| 2,456,106 | A | * | 12/1948 | Beronius | B23K 11/31 219/88 |
| 2,982,257 | A | * | 5/1961 | Fagge | B23K 11/31 92/107 |
| 3,508,029 | A | * | 4/1970 | Inoue | B22F 3/105 219/149 |
| 3,833,785 | A | * | 9/1974 | Roach | B23K 9/013 219/69.16 |

(Continued)

FOREIGN PATENT DOCUMENTS

| CN | 103140318 | 6/2013 |
| GB | 480127 | 2/1938 |

(Continued)

*Primary Examiner* — Thien S Tran
(74) *Attorney, Agent, or Firm* — LEX IP MEISTER, PLLC (57) ABSTRACT

A device of vibro-spot welding includes: a vibration cylinder housing having first and second chambers; an annular rod integrally connected with a first piston disposed in the first chamber and having one end penetrating a side of the vibration cylinder housing; a circular rod penetrating the annular rod integrally connected to a second piston disposed in the second chamber and having one end penetrating the side of the vibration cylinder housing; a leading-in housing wrapping an exterior surface of the vibration cylinder housing and receiving current; an electrode supporter threaded with one end of the leading-in housing; a heating electrode threaded with one end of the electrode supporter; a first vibration electrode threaded with the one end of the annular rod and penetrating the electrode supporter and the heating electrode; and a second vibration electrode threaded with the one end of the circular rod and penetrating the first vibration electrode.

18 Claims, 7 Drawing Sheets (56) References Cited

U.S. PATENT DOCUMENTS

| | | | | | |
|---|---|---|---|---|---|
| 4,748,899 | A | * | 6/1988 | Cote | ........................ B23K 11/31 |
| | | | | | 91/189 R |
| 5,541,382 | A | * | 7/1996 | Taylor | ..................... B23K 11/31 |
| | | | | | 219/117.1 |
| 8,536,480 | B2 | * | 9/2013 | Miwa | .................... B23K 11/311 |
| | | | | | 219/78.01 |
| 2013/0112665 | A1 | * | 5/2013 | Jin | ......................... B23K 11/115 |
| | | | | | 219/78.01 |

FOREIGN PATENT DOCUMENTS

| | | |
|---|---|---|
| JP | 10-205505 | 8/1998 |
| JP | 2003-236677 | 8/2003 |
| JP | 2004-174546 | 6/2004 |
| KR | 10-2012-0010570 | 2/2012 |
| KR | 10-2012-0129516 | 11/2012 |

\* cited by examiner

DEVICE AND METHOD OF VIBRO-SPOT WELDING

CROSS-REFERENCE TO RELATED APPLICATION

This application claims priority to and the benefit of Korean Patent Application No. 10-2014-0007476 filed in the Korean Intellectual Property Office on Jan. 21, 2014, the entire contents of which are incorporated herein by reference.

BACKGROUND OF THE INVENTION (a) Field of the Invention

The present invention relates to a device and a method of vibro-spot welding. More particularly, the present invention relates to a device and a method of vibro-spot welding which welds overlapped metal plates through plastic flow by heating welding portions of the overlapped metal plates and applying linear and repetitive load to the welding portions using a heating electrode and vibration electrodes.

(b) Description of the Related Art

Generally, methods of welding comparatively thin two overlapped metal plates include fusion welding and solid phase welding.

Spot welding which is fusion welding means welding method in which heat due to electrical resistance and pressure are applied to welding portions of the overlapped metal plates such that the welding portions are melted and welded.

Friction stir welding (FSW) which is solid phase welding means welding method in which a probe of a rotating tool is inserted into the overlapped metal plate. In this case, the metal plates around the tool are softened by frictional heat between the rotating probe and the metal plates and the welding portions of both metal plates are forcibly mixed by plastic flow occurring at the welding portions due to stir of the tool. Therefore, the metal plates are welded.

Each of the spot welding and friction stir welding has merits and drawbacks.

For example, since the welding portions of the metal plates are melted and welded by heat generated by the electrical resistance according to the spot welding metal plate, an electric arc occurs at contacting surfaces due to apply of high current and welding surface defects may occur.

Since the friction stir welding is the solid phase welding, mechanical strength of the welded metal plates is excellent and the electric arc does not occur. Therefore, the friction stir welding is suitable for light metal plates. However, welding indentation or hole due to rotation of the probe may remain at the welding surface after welding.

In order to solve such problems of the spot welding and the friction stir welding, a device and a method of vibro-spot welding disclosed in Korean patent No. 1286673 (NOA is issued on Jul. 10, 2013) has been developed. It is disclosed in Korean Patent No. 1286673 that the device and the method of vibro-spot welding includes a pair of vibration welders facing each other with respect to overlapped metal plates, wherein at least one of the pair of vibration welders heats welding portions of the metal plates, generates plastic flow at the welding portions by moving the welding portions reciprocally between the pair of vibration welders, and joining the welding portions by applying pressure to the welding portions at which the plastic flow occurs.

Although the vibration electrodes are disposed on both surfaces of the metal plates according to Korean Patent No. 1286673, however, a cross-sectional shape of the vibration electrode is simple and thus plastic flow of the welding portions is limited.

Therefore, a new device of vibro-spot welding that can remedy shortcomings of Korean Patent No. 1286673 is greatly required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and a method of vibro-spot welding having advantages of stirring liquid metal in welding portions due to occurrence of widespread plastic flow and securing strong welding strength by heating welding portions of overlapped metal plates quickly and crossing an upper vibration electrode and a lower vibration electrode. Therefore, the metal plates can be welded according to various vibration patterns.

In addition, the present invention has been made in an effort to provide a device and a method of vibro-spot welding having further advantages of welding different types of metal plates by controlling output current and vibration stroke individually according to plastic flow temperature and physical characteristics (thickness, material and number) of the overlapped metal plates.

A device of vibro-spot welding according to an exemplary embodiment of the present invention may include: a vibration cylinder housing formed of first and second piston chambers divided by a dividing wall; a first piston rod being an annular rod, integrally connected with a first piston disposed in the first piston chamber, and having one end penetrating a side of the vibration cylinder housing; a second piston rod being a circular rod penetrating the annular rod, integrally connected to a second piston disposed in the second piston chamber, and having one end penetrating the side of the vibration cylinder housing; a leading-in housing wrapping an exterior surface of the vibration cylinder housing and receiving current from a power source; an electrode supporter threaded with one end of the leading-in housing; a heating electrode threaded with one end of the electrode supporter; a first vibration electrode threaded with the one end of the first piston rod and penetrating the electrode supporter and the heating electrode; and a second vibration electrode threaded with the one end of the second piston rod and penetrating the first vibration electrode.

The vibration cylinder housing may be formed of the first and second piston chambers by the dividing wall, and the first and second piston chambers may be divided into two hydraulic chambers by first and second pistons respectively.

The other end portion of the first piston rod may be integrally formed with the first piston, the second piston rod may be inserted in the first piston and the first piston rod so as to be slidable therein, and the other end portion of the second piston rod may be integrally formed with the second piston.

A stopper may be engaged with one end portion of the first piston rod disposed at an exterior of the vibration cylinder housing.

Another stopper may be engaged with the other end portion of the second piston rod disposed at an exterior of the vibration cylinder housing.

The first vibration electrode may be threaded with an exterior circumference of the one end portion of the first piston rod protruded to an exterior of the vibration cylinder housing in the electrode supporter.

The second vibration electrode may be threaded with an engaging hole formed at the one end of the second piston rod protruded to an exterior of the vibration cylinder housing in the first vibration electrode.

The electrode supporter may be threaded to an interior circumference of the one end portion of the leading-in housing so as to apply the current to the heating electrode applied from the power source through the leading-in housing.

The first and second pistons may be individually controlled by hydraulic pressure supplied to the first and second piston chambers of the vibration cylinder housing.

A method of vibro-spot welding according to another exemplary embodiment of the present invention may include: a pressurizing step where a pair of devices of vibro-spot welding respectively contacts with an upper surface and a lower surface of overlapped upper and lower metal plates and pressure is applied to the upper surface and the lower surface of the overlapped upper and lower metal plates through the heating electrodes and the first and second vibration electrodes; a heating step where current is supplied through the heating electrodes vertically contacting with welding portions of the overlapped upper and lower metal plates such that the welding portions of the upper and lower metal plates are heated by heat generated due to electrical resistance; and a forward extruding step where vibration load is applied to the welding portions such that one second vibration electrode and confronting first vibration electrode with respect to the welding portions of the heated upper and lower metal plates iteratively cross and forward extrusion of liquid metal due to plastic flow is iteratively performed.

The forward extruding step may include: a first process where one second vibration electrode moves forward and the confronting first vibration electrode moves rearward with respect to the welding portions of the heated upper and lower metal plates such that the liquid metal in the welding portions is extruded radially outwardly toward a space generated by rearward movement of the first vibration electrode; a second process where the first vibration electrode moves forward and the confronting second vibration electrode moves rearward with respect to the welding portions of the upper and lower metal plates such that the liquid metal in the welding portions is extruded radially inwardly toward a space generated by rearward movement of the second vibration electrode; and a third process where the second vibration electrode and the confronting first vibration electrode return to initial positions thereof with respect to the welding portions of the upper and lower metal plates such that the stirred liquid metal in the welding portions due to plastic flow is solid-phase welded and forms a spot welding portion.

Vibration stroke in the forward extruding step may be controlled individually according to physical characteristics of the upper and lower metal plates.

A method of vibro-spot welding according to another exemplary embodiment of the present invention may include: a pressurizing step where a pair of devices of vibro-spot welding respectively contacts with an upper surface and a lower surface of overlapped upper and lower metal plates and pressure is applied to the upper surface and the lower surface of the overlapped upper and lower metal plates through the heating electrodes and the first and second vibration electrodes; a heating step where current is supplied through the heating electrodes vertically contacting with welding portions of the overlapped upper and lower metal plates such that the welding portions of the upper and lower metal plates are heated by heat generated due to electrical resistance; and a complex forward extruding step where vibration load is applied to the welding portions such that one second vibration electrode and the confronting first vibration electrode, and the other second vibration electrode and the confronting first vibration electrode with respect to the welding portions of the heated upper and lower metal plates cross and forward extrusion of liquid metal due to plastic flow is iteratively performed.

The complex forward extruding step may include: a first process where one second vibration electrode moves forward and the confronting first vibration electrode moves rearward with respect to the welding portions of the heated upper and lower metal plates such that the liquid metal in the welding portions is extruded radially outwardly toward a space generated by rearward movement of the first vibration electrode; a second process where the one first vibration electrode moves forward and the confronting second vibration electrode moves rearward with respect to the welding portions of the upper and lower metal plates such that the liquid metal in the welding portions is extruded radially inwardly toward a space generated by rearward movement of the second vibration electrode; a third process where the one second vibration electrode and the confronting first vibration electrode return to initial positions thereof with respect to the welding portions of the upper and lower metal plates; a fourth process where the other second vibration electrode moves forward and the confronting first vibration electrode moves rearward with respect to the welding portions of the upper and lower metal plates such that the liquid metal in the welding portions is extruded radially outwardly toward a space generated by rearward movement of the other first vibration electrode; a fifth process where the other first vibration electrode moves forward and the confronting second vibration electrode moves rearward with respect to the welding portions of the upper and lower metal plates such that the liquid metal in the welding portions is extruded radially inwardly toward a space generated by rearward movement of the other second vibration electrode; and a sixth process where the other second vibration electrode and the confronting first vibration electrode returns to initial positions thereof with respect to the welding portions of the upper and lower metal plates such that the stirred liquid metal in the welding portion due to plastic flow is solid-phase welded and forms a spot welding portion.

Vibration stroke in the complex forward extruding step may be controlled individually according to physical characteristics of the upper and lower metal plates.

A method of vibro-spot welding according to another exemplary embodiment of the present invention may include: a pressurizing step where a pair of devices of vibro-spot welding of claim 1 respectively contacts with an upper surface and a lower surface of overlapped upper and lower metal plates and pressure is applied to the upper surface and the lower surface of the overlapped upper and lower metal plates through the heating electrodes and the first and second vibration electrodes; a heating step where current is supplied through the heating electrodes vertically contacting with welding portions of the overlapped upper and lower metal plates such that the welding portions of the upper and lower metal plates are heated by heat generated due to electrical resistance; and a rearward extruding step where vibration load is applied to the welding portions such that two second vibration electrodes and the confronting two first vibration electrodes with respect to welding portions of the heated upper and lower metal plates cross and rearward extrusion of liquid metal due to plastic flow is iteratively performed.

The rearward extruding step may include: a first process where the two second vibration electrodes move forward and the confronting two first vibration electrodes move rearward with respect to the welding portions of the heated upper and lower metal plates such that the liquid metal in the welding portions is extruded radially outwardly toward a space generated by rearward movement of the two first vibration electrodes; and a second process where the two second vibration electrodes and the confronting two first vibration electrodes return to initial positions thereof with respect to the welding portions of the upper and lower metal plates such that the liquid metal in the welding portion is extruded toward a space generated by rearward movement of the two second vibration electrodes and the stirred liquid metal in the welding portions due to plastic flow is solid-phase welded to form a spot welding portion.

Vibration stroke in the rearward extruding step may be controlled individually according to physical characteristics of the upper and lower metal plates.

<Description of symbols>

| | |
|---|---|
| 1: dividing wall | 3: vibration cylinder housing |
| 5: leading-in housing | 7: electrode supporter |
| 9: heating electrode | 11: engaging hole |
| 10: device of vibro-spot welding | |
| 13: oil hole | |
| 20: welding robot | 21: frame |
| 23, 25: holder | |
| C1, C2: first and second piston chambers | |
| PS1, PS2: first and second pistons | |
| PR1, PR2: first and second piston rods | |
| ST: stopper | |
| T1, T2: first, second vibration electrode | |
| W: welding portion | SW: spot welding portion |
| P1, P2: upper and lower metal plates | |

DETAILED DESCRIPTION OF THE EMBODIMENTS

Exemplary embodiments of the present invention will hereinafter be described in detail with reference to the accompanying drawings.

Since size and thickness of each component illustrated in the drawings are arbitrarily represented for ease of explanation, the present invention is not limited to the drawings. Thicknesses of many parts and regions are enlarged.

In addition, description of components that are not necessary for explaining the present exemplary embodiments will be omitted, and the same constituent elements are denoted by the same reference numerals in this specification.

In the detailed description, ordinal numbers are used for distinguishing constituent elements having the same terms, and have no specific meanings.

Figure 1:
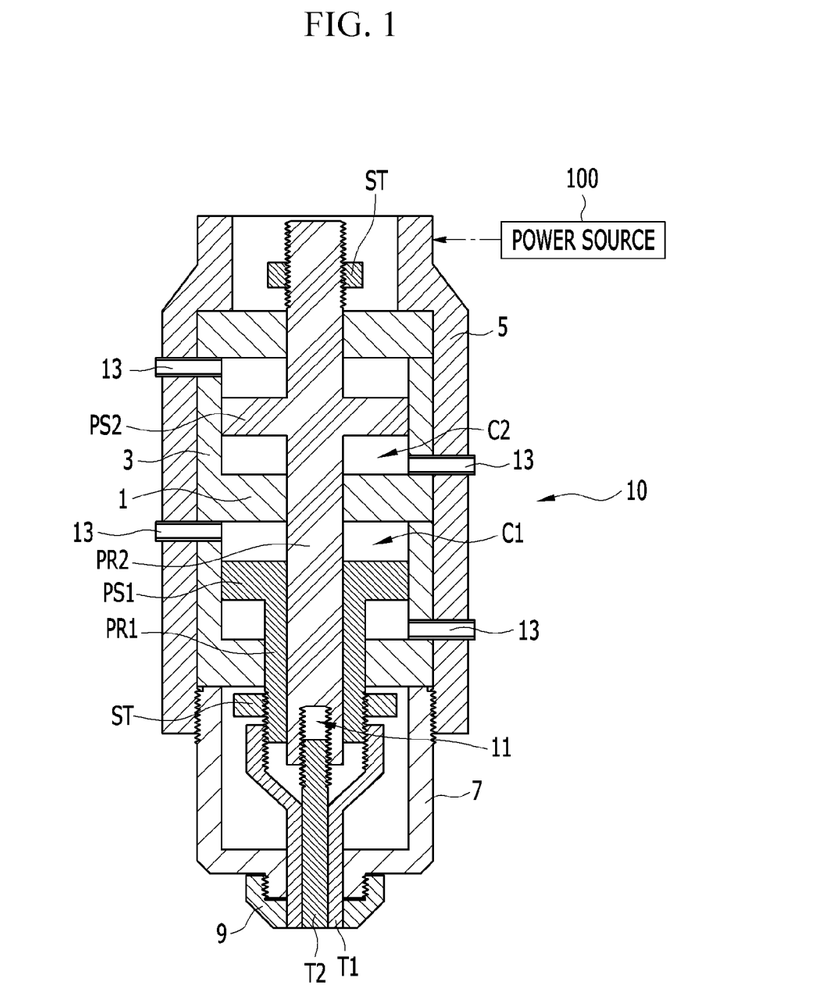
FIG. 1 is a cross-sectional view of a device of vibro-spot welding according to an exemplary embodiment of the present invention.
Figure 2:
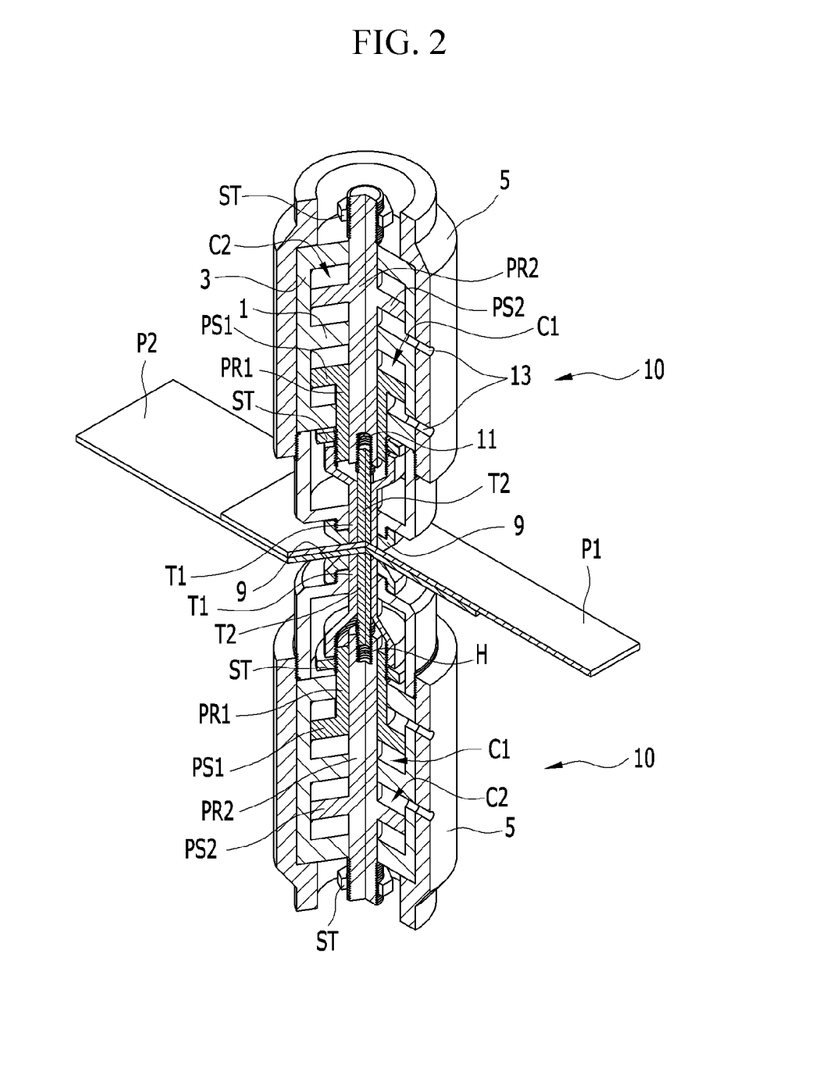
FIG. 2 is a partially cut-away perspective view of a device of vibro-spot welding according to an exemplary embodiment of the present invention that welds overlapped metal plates.

FIG. 1 is a cross-sectional view of a device of vibro-spot welding according to an exemplary embodiment of the present invention, and FIG. 2 is a partially cut-away perspective view of a device of vibro-spot welding according to an exemplary embodiment of the present invention that welds overlapped metal plates.

Referring to FIG. 1 and FIG. 2, a pair of devices 10 of vibro-spot welding is disposed so as to face each other with respect to overlapped upper and lower metal plates P1 and P2 in an exemplary embodiment of the present invention. Each device 10 of vibro-spot welding includes a vibration cylinder housing 3, first and second pistons PS1 and PS2, first and second piston rods PR1 and PR2, a leading-in housing 5, an electrode supporter 7, a heating electrode 9, a first vibration electrode T1 and a second vibration electrode T2.

An inner space of the vibration cylinder housing 3 is divided into two piston chambers C1 and C2 by a dividing wall 1 disposed horizontally therein.

Herein, for convenience of description, a lower piston chamber of the two piston chambers is called a first piston chamber C1 and an upper piston chamber of the two piston chambers is called a second piston chamber C2 in FIG. 1.

At this time, the first and second piston chambers C1 and C2 are divided by the dividing wall 1 and first and second pistons PS1 and PS2 are disposed respectively in the first and second piston chambers C1 and C2.

Each of the first and second piston chambers C1 and C2 is divided into two hydraulic chambers respectively by the first and second pistons PS1 and PS2.

The first and second pistons PS1 and PS2 are independently controlled by hydraulic pressure supplied to the first and second piston chambers C1 and C2 of the vibration cylinder housing 3.

In addition, the first and second piston rods PR1 and PR2 are an annular rod and a circular rod penetrating a center of the annular rod, respectively. The first and second piston rods PR1 and PR2 are disposed respectively in the first and second piston chambers C1 and C2 of the vibration cylinder housing 3.

The first and second piston rods PR1 and PR2 are integrally connected respectively to centers of the first and second pistons PS1 and PS2, and ends of the first and second piston rods PR1 and PR2 penetrate an end surface of the vibration cylinder housing 3 respectively.

That is, the first piston rod PR1 is the annular rod and the other end portion of the first piston rod PR1 is integrally formed with the first piston PS1. The second piston rod PR2 is the circular rod and is tightly inserted in the first piston PS1 and a hollow space of the first piston rod PR1 so as to be slidable therein. The other end portion of the second piston rod PR2 is integrally formed with the second piston PS2.

In addition, a stopper ST is engaged with the other end portion of the first piston rod PR1 disposed at an exterior of the vibration cylinder housing 3 so as to limit vibration stroke when the first piston rod PR1 moves forward.

In addition, another stopper ST is engaged with the side portion of the second piston rod PR2 disposed at an exterior of the side of the vibration cylinder housing 3 so as to limit vibration stroke when the second piston rod PR2 moves rearward.

In addition, the leading-in housing 5 wraps an exterior surface of the vibration cylinder housing 3 and is electrically connected to a power source 100 so as to receive current therefrom.

The electrode supporter 7 is coupled to an end portion of the leading-in housing 3. That is, the electrode supporter 7 is threaded to an interior circumference of the end portion of the leading-in housing 5 so as to apply the current received from the power source 100 through the leading-in housing 5 to the heating electrode 9.

In addition, the heating electrode 9 is threaded to a protruded portion formed at a center of the end of the electrode supporter 7.

In addition, the first vibration electrode T1 penetrates centers of the electrode supporter 7 and the heating electrode 9 in a state of being coupled to the other end of the first piston rod PR1. The first vibration electrode T1 and the first piston rod PR1 are disposed coaxially.

That is, the first vibration electrode T1 is threaded to an exterior circumference of the other end portion of the first piston rod PR1 protruded to the exterior of the vibration cylinder housing 3 in the electrode supporter 7.

In addition, the second vibration electrode T2 penetrates a center of the first vibration electrode T1 in a state of being coupled to the other end of the second piston rod PR2. The second vibration electrode T2 is disposed coaxially with the first vibration electrode T1.

That is, in the first vibration electrode T1, the second vibration electrode T2 is threaded an engaging hole 11 formed at the other end of the second piston rod PR2 that is protruded to the exterior of the vibration cylinder housing 3.

Therefore, the device 10 of vibro-spot welding includes one heating electrode 9 and two vibration electrodes T1 and T2. A pair of devices 10 of vibro-spot welding is disposed to face each other across welding portions W of the overlapped metal plates P1 and P2. The pair of devices 10 of vibro-spot welding heats the welding portions W in a moment and causes the vibration electrodes T1 and T2 to oscillate such that liquid metal in the welding portions W is stirred according to vibration patterns of forward extrusion or rearward extrusion due to wide range plastic flow. Therefore, welding strength at the welding portions W may be strong.

Reference numeral "13" in FIG. 1 and FIG. 2 that is not described herein indicates oil holes for supplying oil to the vibration cylinder housing 3 or exhausting oil from the vibration cylinder housing 30.

Hereinafter, a method of vibro-spot welding according to three vibration patterns that uses the device 10 of vibro-spot welding according to the exemplary embodiment of the present invention will be described in detail.

[Method of Vibro-Spot Welding According to First Vibration Pattern]

Figure 3:
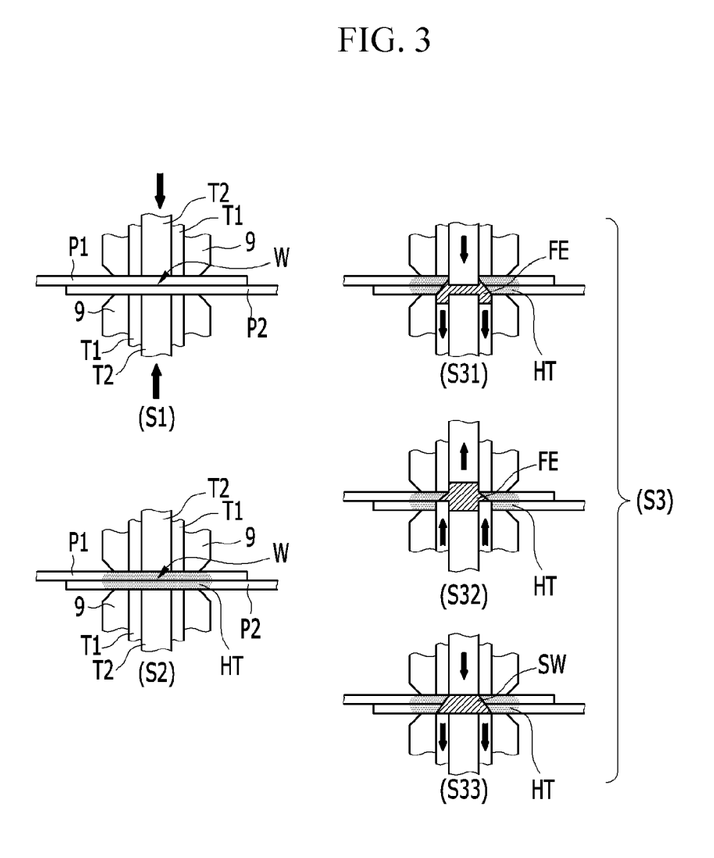
FIG. 3 is a flowchart of a method of vibro-spot welding according to a first vibration pattern using a device of vibro-spot welding according to an exemplary embodiment of the present invention.

Referring to FIG. 3, a method of vibro-spot welding according to a first vibration pattern includes a pressurizing step S1, a heating step S2 and a forward extruding step S3.

The devices 10 of vibro-spot welding are contacted respectively with an upper surface and a lower surface of the upper and lower metal plates P1 and P2, and pressure is applied on the upper surface and the lower surface of the overlapped upper and lower metal plates P1 and P2 through each heating electrode 9 and each of first and second vibration electrodes T1 and T2 in the pressurizing step S1.

At this state, the heating step S2 is performed. Current outputting from a power source 100 is applied to the welding portions W of the overlapped upper and lower metal plates P1 and P2 through each heating electrode 9 contacting vertically to the welding portions W, and the welding portions W of the upper and lower metal plates P1 and P2 are heated through electrical resistance so as to form a heat affected zone HT in the heating step S2.

That is, each heating electrode 9 vertically contacting with the welding portions W of the overlapped upper and lower metal plates P1 and P2 applies current supplied from the power source 100 through the leading-in housing 5 and the electrode supporter 7 to the welding portions W and the welding portions W are quickly heated through electrical resistance so as to form the heat affected zone HT in the heating step S2.

At this time, if the upper and lower metal plates P1 and P2 are made from different materials, current outputting from the power source 100 can be controlled according to plastic flow temperature of each material in the heating step S2.

After that, the forward extruding step S3 is performed on the heated welding portions W of the upper and lower metal plates P1 and P2. The second vibration electrode T2 above the overlapped metal plates P1 and P2 and the first vibration electrode T1 below the overlapped metal plates P1 and P2 apply repetitive vibration load to the welding portions W such that forward extrusion due to plastic flow is performed in the forward extruding step S3. Therefore, the upper and lower metal plates P1 and P2 are vibro-spot welded.

Herein, the 'forward extrusion' means that material is extruded in an operating direction of corresponding vibration electrode T1 or T2. On the contrary, 'rearward extrusion' means that material is extruded in an opposite direction to the operating direction of the corresponding vibration electrode T1 or T2.

The forward extruding step S3 will be described in further detail. The forward extruding step S3 is performed according to a first vibration pattern. The upper second vibration electrode T2 moves forward to the welding portions W of the heated upper and lower metal plates P1 and P2 and the confronting lower first vibration electrode T1 movers rearward according to the first vibration pattern. At this time, liquid metal in the welding portions W moves radially outwardly toward a space generated by rearward movement of the lower first vibration electrode T1 and is extruded in forward direction of the second vibration electrode T2 in a first process S31.

Subsequent to the first process S31, the lower first vibration electrode T1 moves forward to the welding portions W of the upper and lower metal plates P1 and P2 and the confronting second vibration electrode T2 moves rearward. Therefore, the liquid metal in the welding portions W moves radially inwardly toward a space generated by rearward movement of the second vibration electrode T2 and is extruded in forward direction of the first vibration electrode T1 in a second process S32.

If the first process S31 and the second process S32 are iterated such that the liquid metal in the welding portions W is sufficiently stirred through plastic flow, the upper second vibration electrode T2 and the confronting lower first vibration electrode T1 return to their initial positions with respect to the welding portions W of the upper and lower metal plates P1 and P2. Therefore, the liquid metal stirred in the welding portions W through plastic flow is solid phase welded at an initial position so as to form a spot welding portion SW in a third process S33.

Meanwhile, vibration stroke can be controlled independently by controlling operating hydraulic pressure supplied to the vibration cylinder housing 3 according to physical characteristics (thickness, material and number) of the upper and lower metal plates P1 and P2 in the forward extruding step S3.

[Method of Vibro-Spot Welding According to Second Vibration Pattern]

Figure 4:
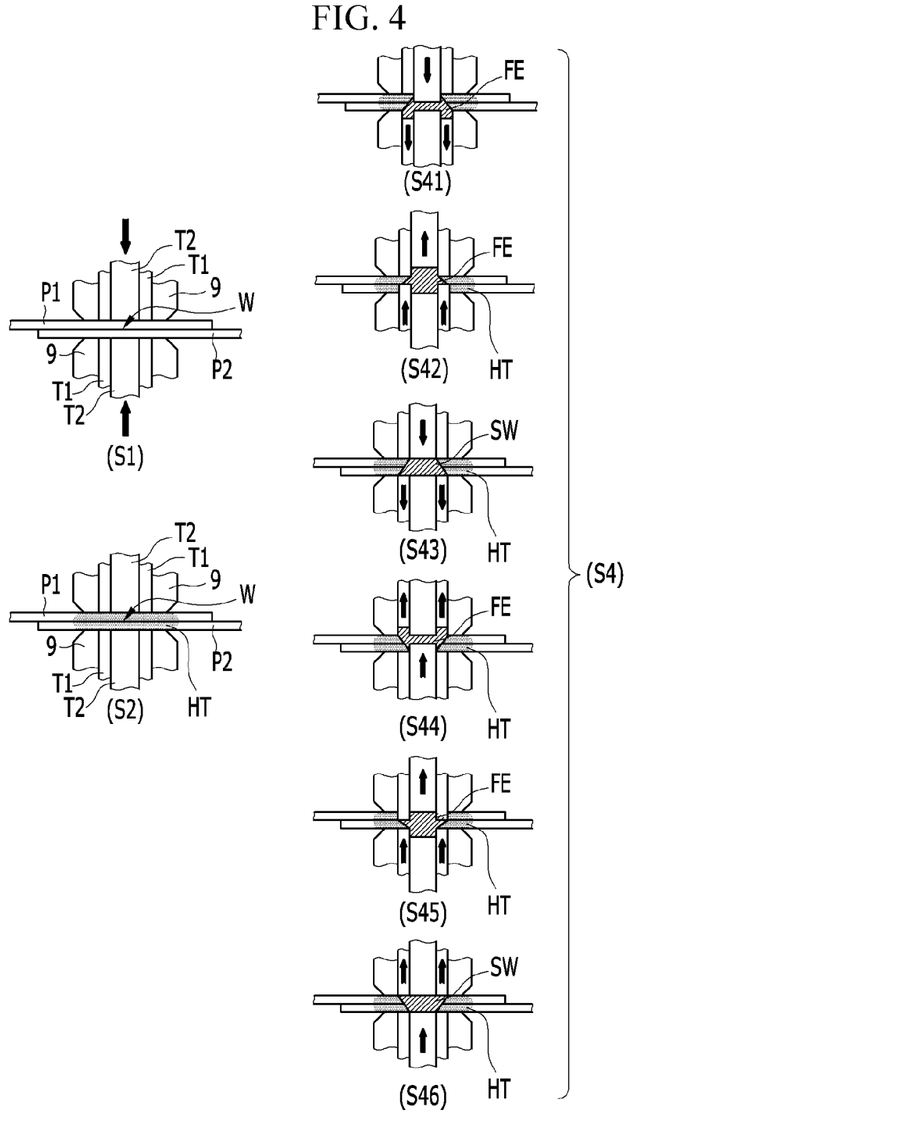
FIG. 4 is a flowchart of a method of vibro-spot welding according to a second vibration pattern using a device of vibro-spot welding according to an exemplary embodiment of the present invention.

Referring to FIG. 4, a method of vibro-spot welding according to a second vibration pattern includes a pressurizing step S1, a heating step S2 and a complex forward extruding step S4.

The devices 10 of vibro-spot welding are contacted respectively with an upper surface and a lower surface of the upper and lower metal plates P1 and P2, and pressure is applied on the upper surface and the lower surface of the overlapped upper and lower metal plates P1 and P2 through each heating electrode 9 and each of first and second vibration electrodes T1 and T2 in the pressurizing step S1.

At this state, the heating step S2 is performed. Current outputting from a power source 100 is applied to the welding portions W of the overlapped upper and lower metal plates P1 and P2 through each heating electrode 9 contacting vertically to the welding portions W, and the welding portions W of the upper and lower metal plates P1 and P2 are heated through electrical resistance so as to form the heat affected zone HT in the heating step S2.

That is, each heating electrode 9 vertically contacting with the welding portions W of the overlapped upper and lower metal plates P1 and P2 applies current supplied from the power source 100 through the leading-in housing 5 and the electrode supporter 7 to the welding portions W and the welding portions W are quickly heated through electrical resistance so as to form the heat affected zone HT in the heating step S2.

At this time, if the upper and lower metal plates P1 and P2 are made from different materials, current outputting from the power source 100 can be controlled according to plastic flow temperature of each material in the heating step S2.

After that, the complex forward extruding step S4 is performed on the heated welding portions W of the upper and lower metal plates P1 and P2. The second vibration electrode T2 above the overlapped metal plates P1 and P2 and the first vibration electrode T1 below the overlapped metal plates P1 and P2, and the second vibration electrode T2 below the overlapped metal plates P1 and P2 and the first vibration electrode T1 above the overlapped metal plates P1 and P2 apply repetitive vibration load to the welding portions W such that forward extrusion due to plastic flow is performed in the complex forward extruding step S4. Therefore, the upper and lower metal plates P1 and P2 are vibro-spot welded.

The complex forward extruding step S4 will be described in further detail. The complex forward extruding step S4 is performed according to the second vibration pattern. The upper second vibration electrode T2 moves forward to the welding portions W of the heated upper and lower metal plates P1 and P2 and the confronting lower first vibration electrode T1 moves rearward according to the second vibration pattern. At this time, the liquid metal in the welding portions W moves radially outwardly toward the space generated by rearward movement of the lower first vibration electrode T1 and is extruded in forward direction of the second vibration electrode T2 in a first process S41.

Subsequent to the first process S41, the lower first vibration electrode T1 moves forward to the welding portions W of the upper and lower metal plates P1 and P2 and the confronting second vibration electrode T2 moves rearward. Therefore, the liquid metal in the welding portions W moves radially inwardly toward the space generated by rearward movement of the second vibration electrode T2 and is extruded in forward direction of the first vibration electrode T1 in a second process S42.

Subsequent to the second process S42, the upper second vibration electrode T2 and the confronting lower first vibration electrode T1 return to their initial positions with respect to the welding portions W of the upper and lower metal plates P1 and P2 in a third process S43.

Subsequent to the third process S43, the lower second vibration electrode T2 moves forward toward the welding portions W of the upper and lower metal plates P1 and P2 and the confronting upper first vibration electrode T1 moves rearward. Therefore, the liquid metal in the welding portions W moves radially outwardly toward the space generated by rearward movement of the upper first vibration electrode T1 and is extruded in forward direction of the second vibration electrode T2 in a fourth process S44.

Subsequent to the fourth process S44, the upper first vibration electrode T1 moves forward to the welding portions W of the upper and lower metal plates P1 and P2 and the confronting lower second vibration electrode T2 moves rearward. Therefore, the liquid metal in the welding portions W moves radially inwardly toward the space generated by rearward movement of the lower second vibration electrode T2 and is extruded in forward direction of the first vibration electrode T1 in a fifth process S45.

Subsequent to the fifth process S45, the lower second vibration electrode T2 and the confronting upper first vibration electrode T1 return to their initial positions with respect to the welding portions W of the upper and lower metal plates P1 and P2 in a sixth process S46.

The second vibration pattern including the first process S41 to the sixth process S46 is iterated such that the liquid metal stirred in the welding portions W through plastic flow is solid phase welded at the initial position so as to form the spot welding portion SW.

Meanwhile, vibration stroke can be controlled independently by controlling operating hydraulic pressure supplied to the vibration cylinder housing 3 according to physical characteristics (thickness, material and number) of the upper and lower metal plates P1 and P2 in the complex forward extruding step S4.

[Method of Vibro-Spot Welding According to Third Vibration Pattern]

Figure 5:
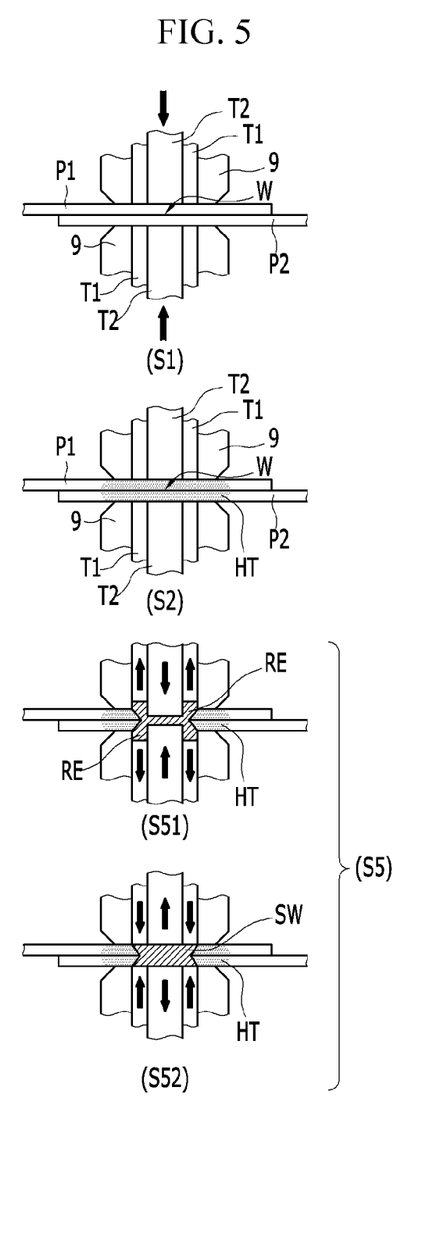
FIG. 5 is a flowchart of a method of vibro-spot welding according to a third vibration pattern using a device of vibro-spot welding according to an exemplary embodiment of the present invention.

Referring to FIG. 5, a method of vibro-spot welding according to a third vibration pattern includes a pressurizing step S1, a heating step S2 and a rearward extruding step S5.

The devices 10 of vibro-spot welding are contacted respectively with an upper surface and a lower surface of the upper and lower metal plates P1 and P2, and pressure is applied on the upper surface and the lower surface of the overlapped upper and lower metal plates P1 and P2 through each heating electrode 9 and each of first and second vibration electrodes T1 and T2 in the pressurizing step S1.

At this state, the heating step S2 is performed. Current outputting from a power source 100 is applied to the welding portions W of the overlapped upper and lower metal plates P1 and P2 through each heating electrode 9 contacting vertically to the welding portions W, and the welding portions W of the upper and lower metal plates P1 and P2 are heated through electrical resistance so as to form the heat affected zone HT in the heating step S2.

That is, each heating electrode 9 vertically contacting with the welding portions W of the overlapped upper and lower metal plates P1 and P2 applies current supplied from the power source 100 through the leading-in housing 5 and the electrode supporter 7 to the welding portions W and the welding portions W are quickly heated through electrical resistance so as to form the heat affected zone HT in the heating step S2.

At this time, if the upper and lower metal plates P1 and P2 are made from different materials, current outputting from the power source 100 can be controlled according to plastic flow temperature of each material in the heating step S2.

After that, the rearward extruding step S5 is performed on the heated welding portions W of the upper and lower metal plates P1 and P2. Two second vibration electrodes T2 and the two confronting first vibration electrodes T1 cross each other and apply repetitive vibration load to the welding portions W of the heated upper and lower metal plates P1 and P2 such that rearward extrusion due to plastic flow is performed in the rearward extruding step S5. Therefore, the upper and lower metal plates P1 and P2 are vibro-spot welded.

The rearward extruding step S5 will be described in further detail. The rearward extruding step S5 is performed according to the third vibration pattern. The two second vibration electrodes T2 move forward to the welding portions W of the heated upper and lower metal plates P1 and P2 and the two confronting first vibration electrodes T1 move rearward in the third vibration pattern. At this time, the liquid metal in the welding portions W moves radially outwardly to the space generated by rearward movements of the two first vibration electrodes T1 and is extruded in rear direction of the two first vibration electrodes T1 in a first process S51.

Subsequent to the first process S51, the two second vibration electrodes T2 and the two confronting first vibration electrodes T1 return to their initial positions with respect to the welding portions W of the upper and lower metal plates P1 and P2. Therefore, the liquid metal in the welding portions W moves to the space generated by rearward movements of the two second vibration electrodes T2 because of forward movements of the two first vibration electrodes T1 and is extruded in rearward direction of the two second vibration electrodes T2 in a second process S52.

The third vibration pattern including the first process S51 and the second process S52 is iterated such that the liquid metal stirred in the welding portions W through plastic flow is solid phase welded at the initial position so as to form the spot welding portion SW.

Meanwhile, vibration stroke can be controlled independently by controlling operating hydraulic pressure supplied to the vibration cylinder housing 3 according to physical characteristics (thickness, material and number) of the upper and lower metal plates P1 and P2 in the rearward extruding step S5.

Figure 6:
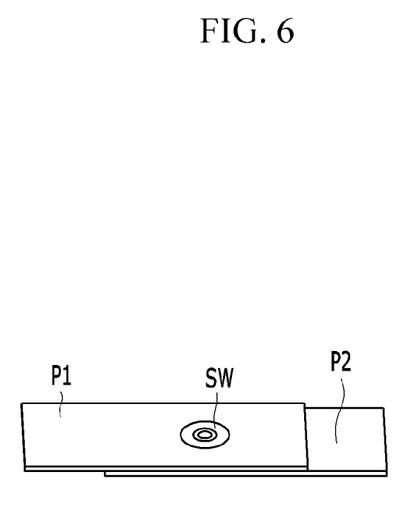
FIG. 6 is a perspective view of metal plates welded by a device of vibro-spot welding according to an exemplary embodiment of the present invention.

FIG. 6 is a perspective view of metal plates welded by a device of vibro-spot welding according to an exemplary embodiment of the present invention.

Referring to FIG. 6, the spot welding portions SW are formed on the upper surface and the lower surface of the metal plates welded through the device 10 of vibro-spot welding according to an exemplary embodiment of the present invention, and a trace of the heating electrode 9 and traces of the first and second vibration electrodes T1 and T2 are left on surfaces of the spot welding portions SW as three concentric circles.

Figure 7:
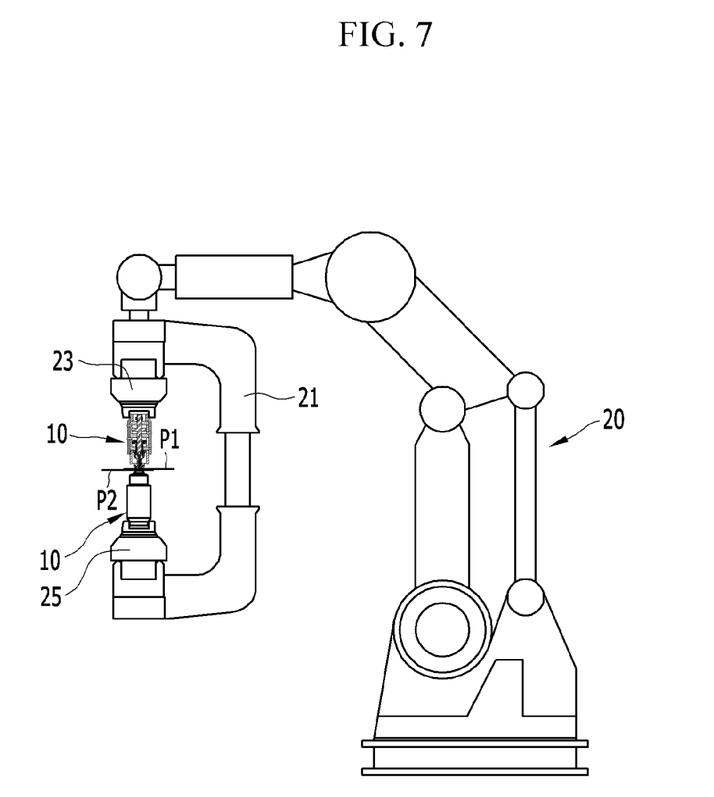
FIG. 7 is a side view of a welding robot system to which a device of vibro-spot welding according to an exemplary embodiment of the present invention is applied.

FIG. 7 is a side view of a welding robot system to which a device of vibro-spot welding according to an exemplary embodiment of the present invention is applied.

Referring to FIG. 7, a pair of devices 10 of vibro-spot welding according to an exemplary embodiment of the present invention can be mounted at an arm of a welding robot 20. That is, a frame 21 is mounted at a front end of the arm of the welding robot 20, and the pair of devices 10 of vibro-spot welding according to an exemplary embodiment of the present invention is mounted respectively at both sides of the frame 21 through holders 23 and 25.

The welding portions of the overlapped metal plates are heated by the heating electrode and are welded by crossing upper vibration electrodes and lower vibration electrodes in various vibration patterns according to an exemplary embodiment of the present invention. Therefore, widespread plastic flow occurs in the welding portions and the liquid metal in the welding portions is stirred so as to secure strong welding strength.

In addition, different types of metal plates can be welded by controlling output current and vibration stroke individually according to plastic flow temperature and physical characteristics (thickness, material and number) of the overlapped metal plates.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device of vibro-spot welding comprising:
 a vibration cylinder housing formed of first and second piston chambers divided by a dividing wall;
 a first piston rod being an annular rod, integrally connected with a first piston disposed in the first piston chamber, and having one end penetrating a side of the vibration cylinder housing;
 a second piston rod being a circular rod penetrating the annular rod, integrally connected to a second piston disposed in the second piston chamber, and having one end penetrating the side of the vibration cylinder housing;
 a leading-in housing wrapping an exterior surface of the vibration cylinder housing and receiving current from a power source;
 an electrode supporter threaded with one end of the leading-in housing;
 a heating electrode threaded with one end of the electrode supporter;

a first vibration electrode threaded with the one end of the first piston rod and penetrating the electrode supporter and the heating electrode; and a second vibration electrode threaded with the one end of the second piston rod and penetrating the first vibration electrode.

2. The device of claim 1, wherein the vibration cylinder housing is formed of the first and second piston chambers by the dividing wall, and the first and second piston chambers are divided into two hydraulic chambers by first and second pistons respectively.

3. The device of claim 1, wherein an other end portion of the first piston rod is integrally formed with the first piston, the second piston rod is inserted in the first piston and the first piston rod so as to be slidable therein, and an other end portion of the second piston rod is integrally formed with the second piston.

4. The device of claim 1, wherein a stopper is engaged with one end portion of the first piston rod disposed at an exterior of the vibration cylinder housing.

5. The device of claim 1, wherein another stopper is engaged with an other end portion of the second piston rod disposed at an exterior of the vibration cylinder housing.

6. The device of claim 1, wherein the first vibration electrode is threaded with an exterior circumference of the one end portion of the first piston rod protruded to an exterior of the vibration cylinder housing in the electrode supporter.

7. The device of claim 1, wherein the second vibration electrode is threaded with an engaging hole formed at the one end of the second piston rod protruded to an exterior of the vibration cylinder housing in the first vibration electrode.

8. The device of claim 1, wherein the electrode supporter is threaded to an interior circumference of an end portion of the leading-in housing so as to apply the current to the heating electrode applied from the power source through the leading-in housing.

9. The device of claim 1, wherein the first and second pistons are individually controlled by hydraulic pressure supplied to the first and second piston chambers of the vibration cylinder housing.

10. A method of vibro-spot welding overlapped upper and lower plates using a pair of welding devices of vibro-spot welding where overlapped upper and lower plates are disposed between the pair of welding devices and the pair of welding devices respectively contacts an upper surface and a lower surface of overlapped upper and lower metal plates, each welding device including a vibration cylinder housing formed of first and second piston chambers divided by a dividing wall, a first piston rod being an annular rod, integrally connected with a first piston disposed in the first piston chamber, and having one end penetrating a side of the vibration cylinder housing, a second piston rod being a circular rod penetrating the annular rod, integrally connected to a second piston disposed in the second piston chamber, and having one end penetrating the side of the vibration cylinder housing, a leading-in housing wrapping an exterior surface of the vibration cylinder housing and receiving current from a power source, an electrode supporter threaded with one end of the leading-in housing, a heating electrode threaded with one end of the electrode supporter, a first vibration electrode threaded with the one end of the first piston rod and penetrating the electrode supporter and the heating electrode, and a second vibration electrode threaded with the one end of the second piston rod and penetrating the first vibration electrode, the method comprising:

a pressurizing step where pressure is applied to the upper surface and the lower surface of the overlapped upper and lower metal plates through the heating electrodes and the first and second vibration electrodes of both welding devices;

a heating step where current is supplied through the heating electrodes vertically contacting with welding portions of the overlapped upper and lower metal plates such that the welding portions of the upper and lower metal plates are heated by heat generated due to electrical resistance; and a forward extruding step where vibration load is applied to the welding portions such that one second vibration electrode and confronting first vibration electrode with respect to the welding portions of the heated upper and lower metal plates iteratively cross and forward extrusion of liquid metal due to plastic flow is iteratively performed.

11. The method of claim 10, wherein the forward extruding step comprises:

a first process where one second vibration electrode moves forward and the confronting first vibration electrode moves rearward with respect to the welding portions of the heated upper and lower metal plates such that the liquid metal in the welding portions is extruded radially outwardly toward a space generated by rearward movement of the first vibration electrode;

a second process where the first vibration electrode moves forward and the confronting second vibration electrode moves rearward with respect to the welding portions of the upper and lower metal plates such that the liquid metal in the welding portions is extruded radially inwardly toward a space generated by rearward movement of the second vibration electrode; and a third process where the second vibration electrode and the confronting first vibration electrode return to initial positions thereof with respect to the welding portions of the upper and lower metal plates such that the stirred liquid metal in the welding portions due to plastic flow is solid-phase welded and forms a spot welding portion.

12. The method of claim 10, wherein vibration stroke in the forward extruding step is controlled individually according to physical characteristics of the upper and lower metal plates.

13. A method of vibro-spot welding overlapped upper and lower plates using a pair of welding devices of vibro-spot welding where overlapped upper and lower plates are disposed between the pair of welding devices and the pair of welding devices respectively contacts an upper surface and a lower surface of overlapped upper and lower metal plates, each welding device including a vibration cylinder housing formed of first and second piston chambers divided by a dividing wall, a first piston rod being an annular rod, integrally connected with a first piston disposed in the first piston chamber, and having one end penetrating a side of the vibration cylinder housing, a second piston rod being a circular rod penetrating the annular rod, integrally connected to a second piston disposed in the second piston chamber, and having one end penetrating the side of the vibration cylinder housing, a leading-in housing wrapping an exterior surface of the vibration cylinder housing and receiving current from a power source, an electrode supporter threaded with one end of the leading-in housing, a heating electrode threaded with one end of the electrode supporter, a first vibration electrode threaded with the one end of the first piston rod and penetrating the electrode supporter and the heating electrode, and a second vibration electrode threaded with the one end of the second piston rod and penetrating the first vibration electrode, the method comprising:
- a pressurizing step where pressure is applied to the upper surface and the lower surface of the overlapped upper and lower metal plates through the heating electrodes and the first and second vibration electrodes of both welding devices;
- a heating step where current is supplied through the heating electrodes vertically contacting with welding portions of the overlapped upper and lower metal plates such that the welding portions of the upper and lower metal plates are heated by heat generated due to electrical resistance; and
- a complex forward extruding step where vibration load is applied to the welding portions such that one second vibration electrode and the confronting first vibration electrode, and the other second vibration electrode and the confronting first vibration electrode with respect to the welding portions of the heated upper and lower metal plates cross and forward extrusion of liquid metal due to plastic flow is iteratively performed.

14. The method of claim 13, wherein the complex forward extruding step comprises:
- a first process where one second vibration electrode moves forward and the confronting first vibration electrode moves rearward with respect to the welding portions of the heated upper and lower metal plates such that the liquid metal in the welding portions is extruded radially outwardly toward a space generated by rearward movement of the first vibration electrode;
- a second process where the one first vibration electrode moves forward and the confronting second vibration electrode moves rearward with respect to the welding portions of the upper and lower metal plates such that the liquid metal in the welding portions is extruded radially inwardly toward a space generated by rearward movement of the second vibration electrode;
- a third process where the one second vibration electrode and the confronting first vibration electrode return to initial positions thereof with respect to the welding portions of the upper and lower metal plates;
- a fourth process where the other second vibration electrode moves forward and the confronting first vibration electrode moves rearward with respect to the welding portions of the upper and lower metal plates such that the liquid metal in the welding portions is extruded radially outwardly toward a space generated by rearward movement of the other first vibration electrode;
- a fifth process where the other first vibration electrode moves forward and the confronting second vibration electrode moves rearward with respect to the welding portions of the upper and lower metal plates such that the liquid metal in the welding portions is extruded radially inwardly toward a space generated by rearward movement of the other second vibration electrode; and
- a sixth process where the other second vibration electrode and the confronting first vibration electrode returns to initial positions thereof with respect to the welding portions of the upper and lower metal plates such that the stirred liquid metal in the welding portion due to plastic flow is solid-phase welded and forms a spot welding portion.

15. The method of claim 13, wherein vibration stroke in the complex forward extruding step is controlled individually according to physical characteristics of the upper and lower metal plates.

16. A method of vibro-spot welding overlapped upper and lower plates using a pair of welding devices of vibro-spot welding where overlapped upper and lower plates are disposed between the pair of welding devices and the pair of welding devices respectively contacts an upper surface and a lower surface of overlapped upper and lower metal plates, each welding device including a vibration cylinder housing formed of first and second piston chambers divided by a dividing wall, a first piston rod being an annular rod, integrally connected with a first piston disposed in the first piston chamber, and having one end penetrating a side of the vibration cylinder housing, a second piston rod being a circular rod penetrating the annular rod, integrally connected to a second piston disposed in the second piston chamber, and having one end penetrating the side of the vibration cylinder housing, a leading-in housing wrapping an exterior surface of the vibration cylinder housing and receiving current from a power source, an electrode supporter threaded with one end of the leading-in housing, a heating electrode threaded with one end of the electrode supporter, a first vibration electrode threaded with the one end of the first piston rod and penetrating the electrode supporter and the heating electrode, and a second vibration electrode threaded with the one end of the second piston rod and penetrating the first vibration electrode, the method comprising:
- a pressurizing step where pressure is applied to the upper surface and the lower surface of the overlapped upper and lower metal plates through the heating electrodes and the first and second vibration electrodes of both welding devices;
- a heating step where current is supplied through the heating electrodes vertically contacting with welding portions of the overlapped upper and lower metal plates such that the welding portions of the upper and lower metal plates are heated by heat generated due to electrical resistance; and
- a rearward extruding step where vibration load is applied to the welding portions such that two second vibration electrodes and the confronting two first vibration electrodes with respect to welding portions of the heated upper and lower metal plates cross and rearward extrusion of liquid metal due to plastic flow is iteratively performed.

17. The method of claim 16, wherein the rearward extruding step comprises:
- a first process where the two second vibration electrodes move forward and the confronting two first vibration electrodes move rearward with respect to the welding portions of the heated upper and lower metal plates such that the liquid metal in the welding portions is extruded radially outwardly toward a space generated by rearward movement of the two first vibration electrodes; and
- a second process where the two second vibration electrodes and the confronting two first vibration electrodes return to initial positions thereof with respect to the welding portions of the upper and lower metal plates such that the liquid metal in the welding portion is extruded toward a space generated by rearward movement of the two second vibration electrodes and the stirred liquid metal in the welding portions due to plastic flow is solid-phase welded to form a spot welding portion.

18. The method of claim 16, wherein vibration stroke in the rearward extruding step is controlled individually according to physical characteristics of the upper and lower metal plates.

* * * * *